US010839171B2

(12) United States Patent
Gangopadhyay et al.

(10) Patent No.: US 10,839,171 B2
(45) Date of Patent: Nov. 17, 2020

(54) INTEGRATED SENSING TAG-BASED WIRELESS SENSING WITHIN ELECTRONIC DEVICES

(71) Applicant: Apple Inc., Cupertino, CA (US)

(72) Inventors: Daibashish Gangopadhyay, San Jose, CA (US); Fenghua Zheng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/391,011

(22) Filed: Apr. 22, 2019

(65) Prior Publication Data
US 2020/0334425 A1 Oct. 22, 2020

(51) Int. Cl.
*G06K 7/10* (2006.01)
*G08C 17/02* (2006.01)

(52) U.S. Cl.
CPC ..... *G06K 7/10158* (2013.01); *G06K 7/10346* (2013.01); *G08C 17/02* (2013.01)

(58) Field of Classification Search
None
See application file for complete search history.

(56) References Cited

U.S. PATENT DOCUMENTS

| 7,336,153 B2 * | 2/2008 | Malone .................. G01K 1/024 340/10.1 |
| 9,077,067 B2 | 7/2015 | Ikemoto |
| 9,151,679 B2 | 10/2015 | MacDonald et al. |

FOREIGN PATENT DOCUMENTS

CN 102620852 A 8/2012

* cited by examiner

*Primary Examiner* — Kristy A Haupt
(74) *Attorney, Agent, or Firm* — Fletcher Yoder PC

(57) ABSTRACT

The present disclosure relates generally to electronic devices, and more particularly, to electronic devices that utilize electromagnetic signals (e.g., radio frequency (RF) signals), transmitters, and receivers in various processes, such as cellular and wireless device processes in a at least partially metal enclosure. The present disclosure describes devices that may be used to wirelessly transmit and/or receive electromagnetic signals between processing components and sensing components, for example, by improving sensing device design and thus forming an integrated sensing tag that leverages passive RF technology, such as radio frequency identification (RFID) tags.

20 Claims, 13 Drawing Sheets

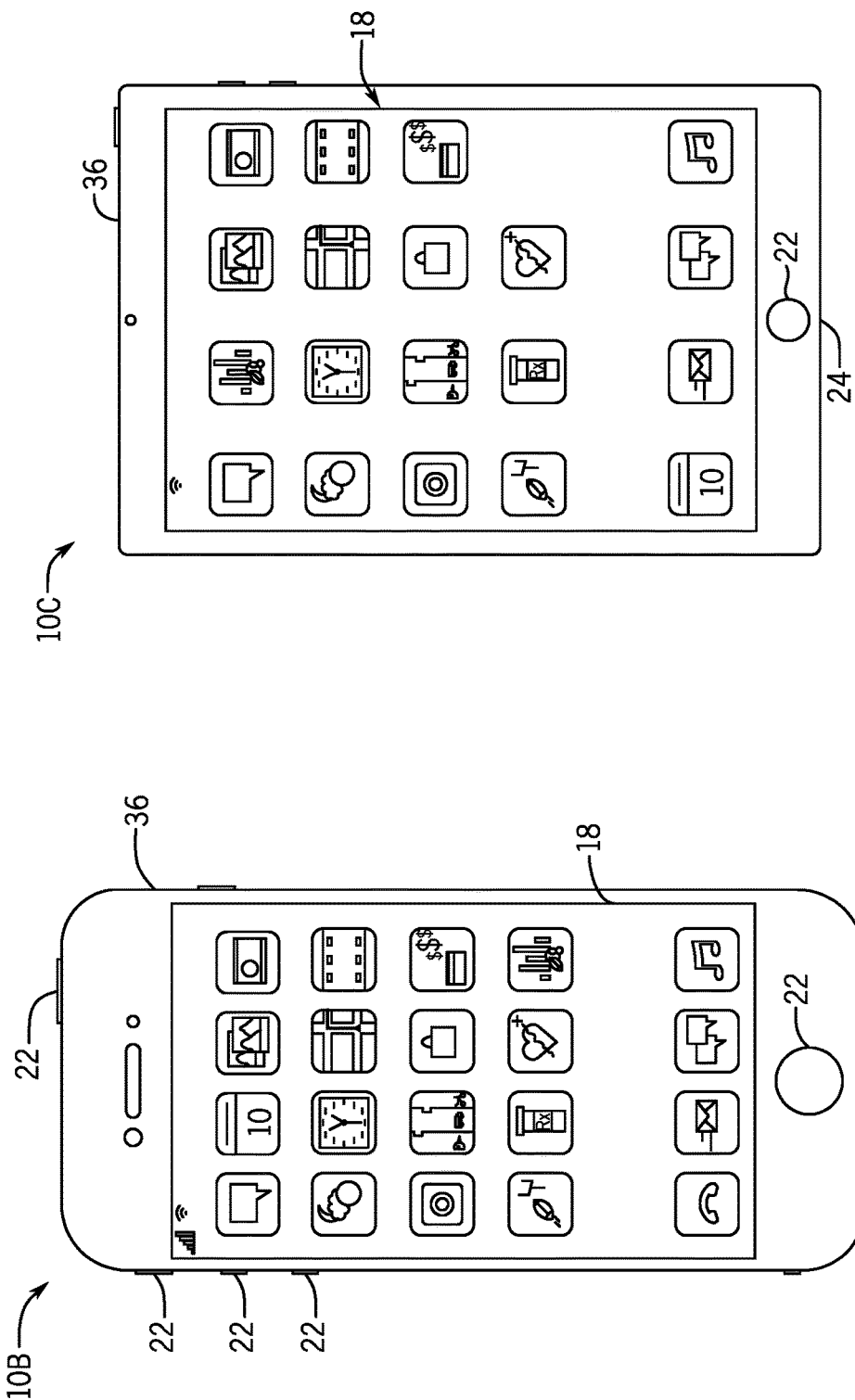

INTEGRATED SENSING TAG-BASED WIRELESS SENSING WITHIN ELECTRONIC DEVICES

BACKGROUND

The present disclosure generally relates to electronic devices, and more particularly, to electronic devices that utilize electromagnetic signals (e.g., radio frequency signals), transmitters, and receivers in various processes, such as cellular and wireless device processes.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Sensors are commonly included in various electronic devices, and particularly, portable electronic devices such as, for example, phones (e.g., mobile and cellular phones, cordless phones, personal assistance devices), computers (e.g., laptops, tablet computers), Internet connectivity routers (e.g., Wi-Fi routers or modems), radios, televisions, or any of various stationery or handheld and/or portable devices. In some embodiments, the sensors are coupled through wired connections (e.g., channels, physical couplings) to processing circuitry. The processing circuitry may interpret data transmitted from the sensors, where the data may be indicative of one or more sensed parameters gathered during a sensing operation of one or more of the sensors. The processing circuitry may make control decisions, operational adjustments, or the like based on results of the interpretation of the data transmitted from the sensors.

A varying number of sensors may be included in the electronic device based on, for example, the specific type of electronic device and/or the control operation the sensor is associated with. In this way, there may be some cases where a number of sensors is large enough that the number of wired connections becomes burdensome to efficient operation and/or efficient design of the electronic device. For example, circuitry of the electronic device may be complicated because of the inclusion of the sensors and usage of wired connections between the sensors and the processing circuitry. In addition, using sensors for sensing operations may use relatively large amounts of power because the sensors may consume additional power even when not performing a sensing operation (e.g., when the sensor is idle).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in receiving and supporting data signals wirelessly transmitted through radio frequency (RF) signals and/or other suitable electromagnetic signals from sensors to processing circuitry. As described above, these sensors are typically coupled to the processing circuitry through wired connections. These wired connections may lead to design congestion and/or inefficient usage of physical space associated with the electronic device (e.g., wasting space of a printed circuit board (PCB) on physical connections between components). However, integration of wireless technology with the sensors may obviate the use of the wired connections and permit wireless communication between the processing circuitry and the sensors. Wirelessly transmitting data from the sensors to the processing circuitry may volunteer space previously used for the wired connections of the electronic device for other uses.

Furthermore, passive tags, such as radio frequency identification (RFID) tags, integrated with an antenna and circuitry to perform one or more sensing operations (e.g., integrated sensing tags) may be used in this system. An integrated sensing tag may receive an electromagnetic signal and may be powered from the electromagnetic signal to perform its associated sensing operation. The integrated sensing tag may use power gathered from the electromagnetic signal to transmit sensing data from the sensing operation, and thus may consume minimal amounts of power in-between data transmissions while idle. Thus, usage of integrated sensing tags in electronic devices may reduce power consumption associated with data transmission, which made lead to overall power reductions of the electronic device.

By way of example, an electronic device may include integrated sensing tags that use passive transmission techniques and are powered from an electromagnetic signal incident to the integrated sensing tag. The integrated sensing tag may perform its sensing operation and may transmit sensed data to a tag reader, such as a radio frequency identification (RFID) tag reader, using the extracted power. The tag reader may be coupled to processing circuitry that performs a control operation based on the sensed data wirelessly transmitted from the integrated sensing tag without a reliance on wired connections between the sensing circuitry and the processing circuitry. However, using passive transmission techniques within an electronic device, and in particular within a partial or full metal enclosure (e.g., a metal enclosure of an electronic device, a metal enclosure of an electronic device that is relatively thin) that may have a relatively small width between plates of the metal enclosure, may be inefficient. In these systems, transmission quality may be undesirable. Thus, discussed herein are systems and methods to improve passive transmission techniques as applied to wireless sensing operations within an electronic device, and in particular within partial metal enclosures and/or full metal enclosures.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing a second embodiment of the electronic device of FIG. 1, in accordance with an embodiment;

FIG. 4 is a front view of another hand-held device representing a third embodiment of the electronic device of FIG. 1, in accordance with an embodiment;

DETAILED DESCRIPTION OF SPECIFIC EMBODIMENTS

Figure 1:
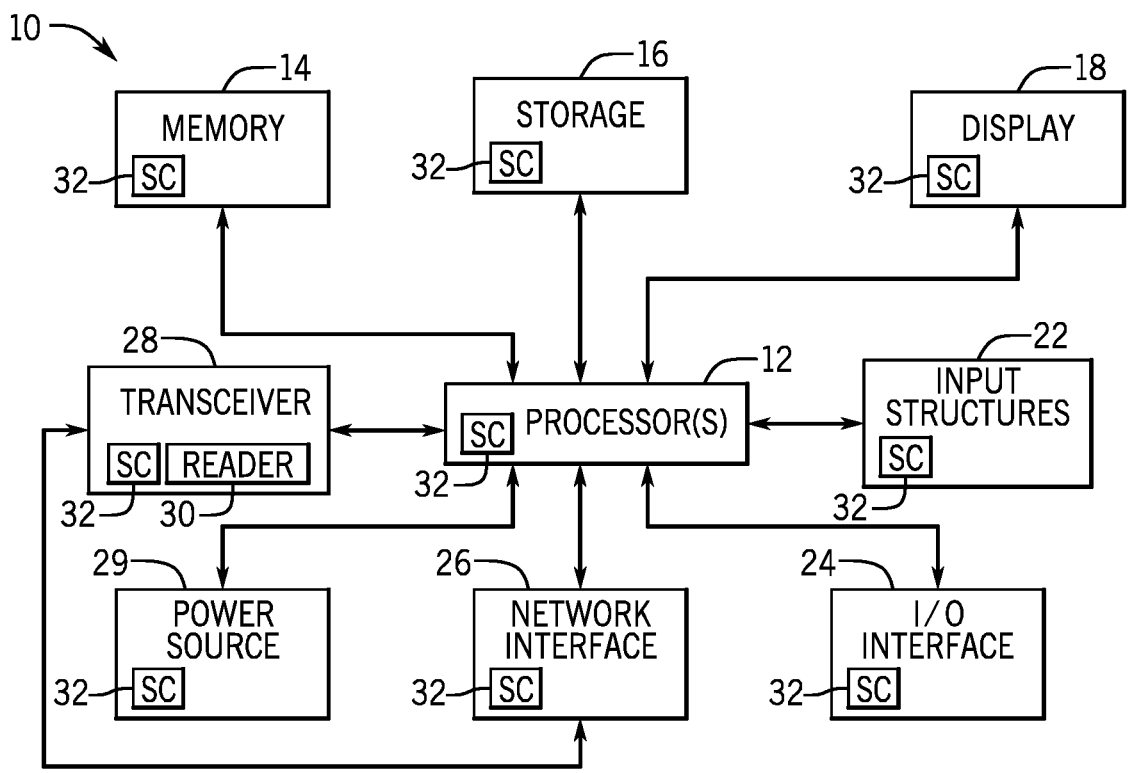
FIG. 1 is a schematic block diagram of an electronic device including a transceiver that communicates with one or more integrated sensing tags in response to a processor initiating sensing operations, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Embodiments of the present disclosure generally relate to integrated sensing tags of an electronic device that wirelessly transmit sensing data associated with a sensing operation using passive transmission techniques. In some embodiments, the electronic device may include radio frequency identification (RFID) reader circuitry (e.g., Wi-Fi and/or LTE RF circuitry, front end circuitry) that is used, for example, to support transmission and/or reception of RF signals that follow various wireless communication standards or additional communication standards. It may be desirable to leverage this RFID reader and other similar passive tag reading technology to transmit sensed data from the integrated sensing tags to processing circuitry. The processing circuitry may use sensing data from the integrated sensing tag similar to sensing data gathered from sensing circuitry coupled to the processing circuitry via hardwired connections (e.g., physical wires, physical couplings). In this way, the processing circuitry may use the received data in one or more control operations of the electronic device, for storage, for display on a graphical user interface (GUI), or the like.

The electronic devices discussed herein may include certain transceiver circuitry (e.g., a transmitter and/or receiver) and a tag reader. Including this circuitry may permit the tag reader to transmit and/or receive signals to perform sensing operations. For example, these tag sensing operations (e.g., using an integrated sensing tag to perform sensing operations) may obviate use of wired connections between sensors and processing circuitry since sensed data may be wirelessly transmitted from the sensor to the tag reader accessible by the processing circuitry. However, using tag sensing operations in an integrated circuit may create a challenge of transmitting wireless signals between printed circuit boards (PCBs) while maintaining characteristics of the wireless signal. In particular, using tag sensing operations in an integrated circuit disposed an electronic device may cause electromagnetic signals transmitted between the processing circuitry and the sensor to have undesirable characteristics (e.g., attenuation, unsuitable power transfer, or the like). A design for an integrated sensing tag and transmission system is described herein to facilitate wireless signal transmission between processing circuitry and integrated sensing tags within an electronic device, and in particular within partial metal enclosures of the electronic device and/or full metal enclosures of the electronic device. With the foregoing in mind, a general description of suitable electronic devices that may include such an integrated sensing tag is provided below.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular embodiment and is intended to illustrate the types of elements that may be present in the electronic device 10.

Figure 2:
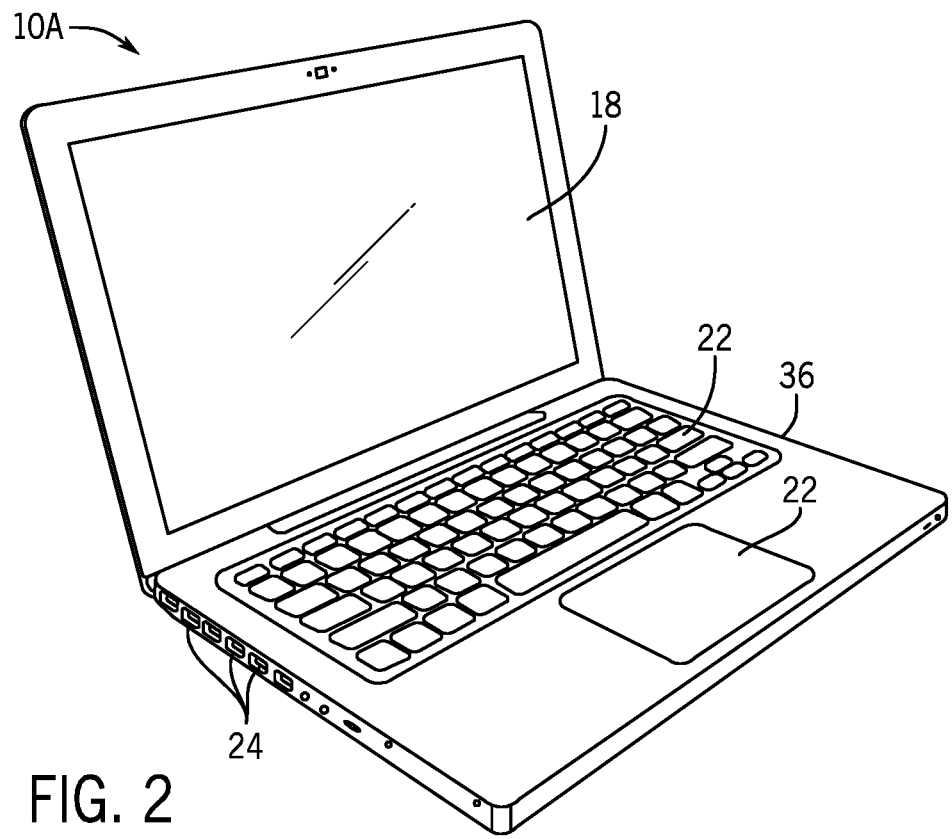
FIG. 2 is a perspective view of a notebook computer representing a first embodiment of the electronic device of FIG. 1, in accordance with an embodiment.
Figure 5:
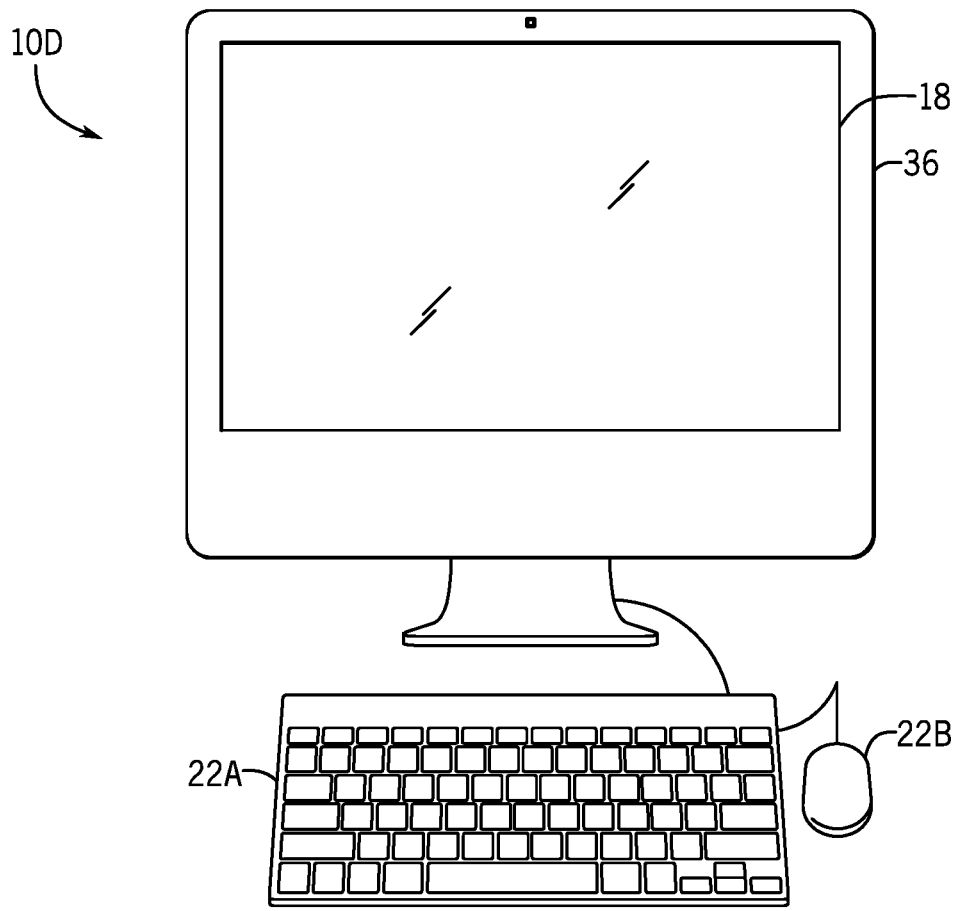
FIG. 5 is a front view of a desktop computer representing a fourth embodiment of the electronic device of FIG. 1, in accordance with an embodiment.
Figure 6:
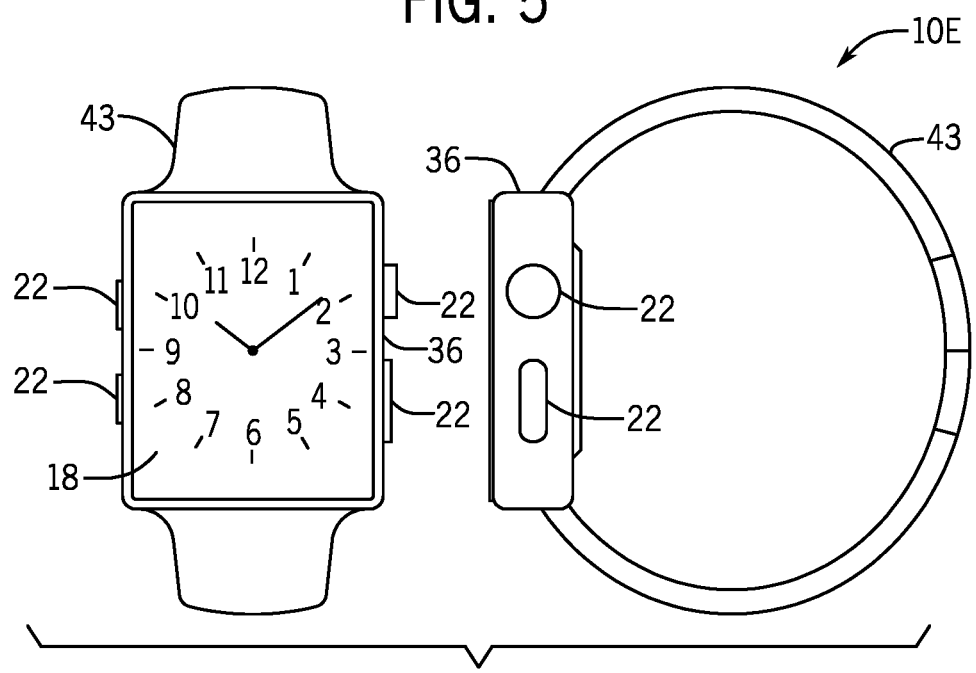
FIG. 6 is a front view and side view of a wearable electronic device representing a fifth embodiment of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may operably couple with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth.

In some embodiments, the electronic device 10 communicates over the aforementioned wireless networks (e.g., Wi-Fi, WiMAX, mobile WiMAX, 4G, LTE, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. The transceiver 28 may transmit electromagnetic signals to circuitry of the electronic device 10. For example, the transceiver 28 may include a sensing circuitry reader 30 to communicate wirelessly with sensing circuitry 32 located within various components of the electronic device 10, such as the display 18, the storage 16, input structures 22, power source 29, and so on. Data transmitted between the components and the transceiver 28 may be used by the processor 12 to control one or more operations of the electronic device 10 (e.g., one or more operations of any of the individual components of the electronic device 10). As further illustrated, the electronic device 10 may include the power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or an enclosure 36, the display 18, the input structures 22, and ports associated with the I/O interface 24.

In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, Calif., a universal service bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback and/or certain phone capabilities. The input structures 22 may also include a headphone input to provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple, Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E.

As previously noted above, in certain embodiments (e.g., notebook computer 10A, handheld device 10B, handheld device 10C, computer 10D, and wearable electronic device 10E) of the electronic device 10 may include the transceiver 28 which includes sensing circuitry reader 30 used to communicate with wireless sensing circuitry 32 within, for example, the display 18. For ease of discussion, the wireless sensing circuitry reader 30 is herein referred to as a tag reader and the wireless sensing circuitry 32 are referred to as integrated sensing tags. It should be understood that although described with respect to tags, the wireless sensing technologies described herein may be used in a variety of suitable geometries and applications.

Figure 7:
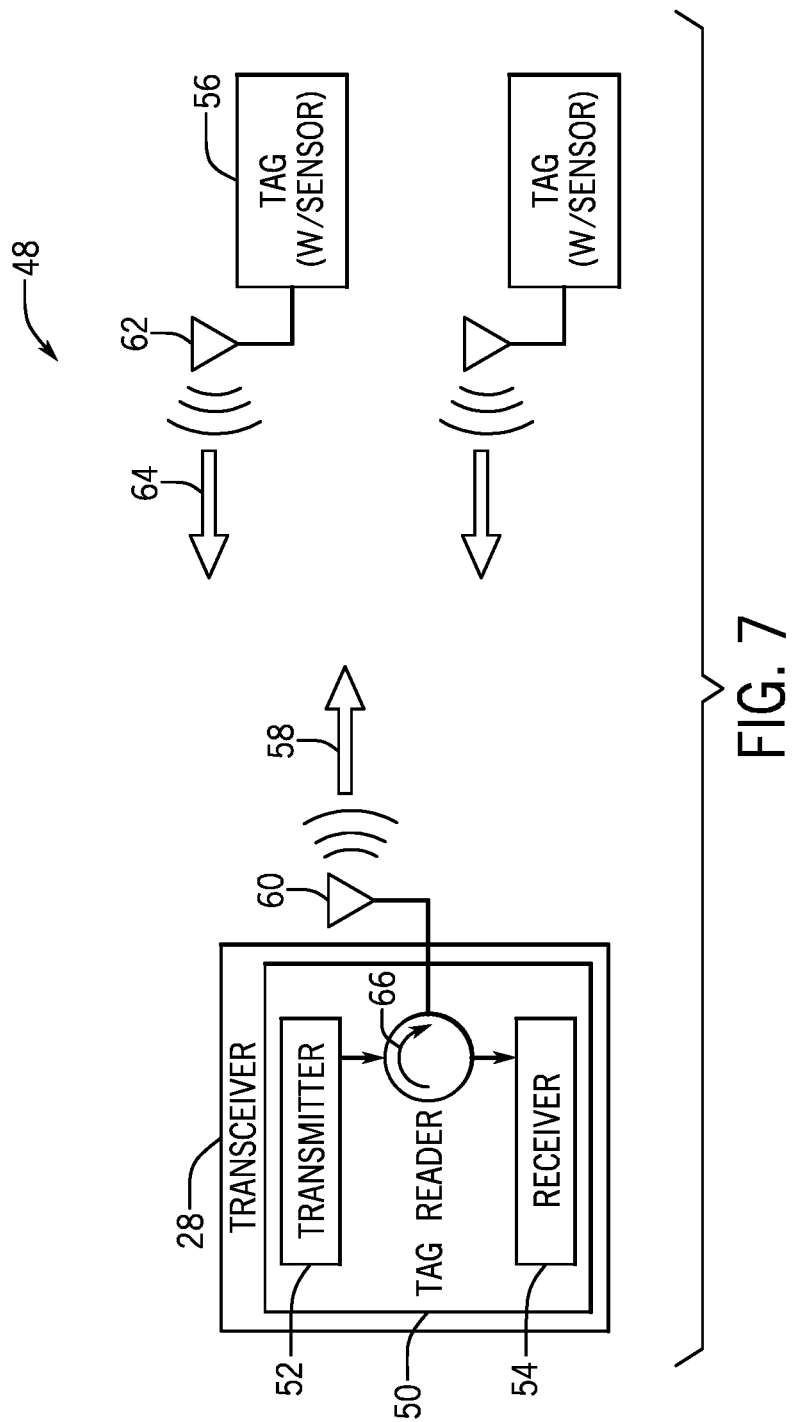
FIG. 7 is an illustration of sensing operations that use integrated sensing tags, in accordance with an embodiment.

With the foregoing in mind, FIG. 7 depicts a schematic block diagram of an embodiment of transmission system 48 including a tag reader 50 within transceiver 28. In the illustrated embodiment, the tag reader 50 is included within the transceiver 28, but in some embodiments, the transceiver 28 and the tag reader 50 may be included on different circuitry and/or within in different transceiver circuitry. Further, the various functional blocks shown in FIG. 7 may include hardware elements (including circuitry), software elements (including computer code stored on a computer-readable medium) or a combination of both hardware and software elements. It should also be noted that FIG. 7 is merely one example and is intended to illustrate the types of components that may be present in the tag reader 50. As such, functional blocks may be added or omitted and arrangement within the tag reader 50 may be modified.

The tag reader 50 may include a transmitter 52 and a receiver 54. The transmitter 52 may generate an initiation signal (e.g., an electromagnetic signal) and transmit the initiation signal to an integrated sensing tag 56. The integrated sensing tag 56 may be designed to be powered from the initiation signal. For example, the integrated sensing tag 56 may include an inductor to generate one or more currents from the received electromagnetic signal. Thus, the initiation signal may be used to initiate performance of sensing operations. The initiation signal may be generally represented by arrow 58. The tag reader 50 may couple to an antenna 60 that is used to transmit the initiation signal and receive back-scattered signals from the integrated sensing tag 56. The antenna 60 may be any suitable antenna configuration, for example, a diploe antenna, a slot antenna, or the like.

The back-scattered signals may be generated by the integrated sensing tag 56 in response to receiving the initiation signal, and thus may be considered sensing data and/or sensing data signals. Each integrated sensing tag 56 may include a tag antenna 62 to receive the initiation signal. The tag antenna 62 may be any suitable antenna configuration, for example, a diploe antenna, a slot antenna, or the like. The initiation signal may be an incident electromagnetic signal relative to the integrated sensing tag 56. Upon receiving the initiation signal, sensing circuitry of the integrated sensing tag 56 may be temporarily powered. In this way, the tag reader 50 may independently activate different integrated sensing tags 56 at varying times (to perform sensing operations) based on the initiation signal and propagation patterns of the initiation signal. Since the integrated sensing tag 56 is not powered independent of the initiation signal, the integrated sensing tag 56 does not consume power without first receiving the initiation signal to initiate the sensing operation. Selectively enabling the integrated sensing tag 56 may reduce overall power consumed by the electronic device 10 since the integrated sensing tags 56 consume power when performing a sensing operation (or a transmission operation associated with the sensing operation) and do not consume power, or consume negligible amounts of power, while idle.

After receiving the initiation signal via the tag antenna 62, the integrated sensing tag 56 performs its sensing operation. The integrated sensing tag 56 may perform any suitable sensing operation that uses an amount of power transmittable via the initiation signal. For example, the integrated sensing tag 56 may sense a current or a voltage value that corresponds to a change in temperature, pressure, light, audio, or the like to perform a sensing operation of that particular parameter (e.g., temperature, pressure, light, audio, etc.).

The output from the sensing operation may be a sensing data signal that modulates in time and/or space based on the value of the sensed parameter. The integrated sensing tag 56 may transmit the sensing data signal to the tag reader 50 via the tag antenna 62. Upon the tag reader 50 receiving the sensing data signal, the tag reader 50 may communicate the sensing data signal to processing circuitry for further processing, storage, and/or use. The sensing data signal is represented by arrow 64.

The tag reader 50 may include a transmit-receive switch (T/R switch) 66 to separate transmission operations from receiving operations. The T/R switch 66 may be any suitable circuitry used to separate signals being transmitted by the tag reader 50 circuitry from signals being received by the tag reader 50 circuitry. In this way, the T/R switch 66 may include any suitable combination of analog circuitry, digital circuitry, and/or electromagnetic signal-compatible circuitry, such as waveguides or other suitable passive circuitry or active circuitry.

The transmission system 48 of FIG. 7 may be applied to a variety of suitable electronic circuitry. For example, personal computing devices, industrial computing devices, keyboards, laptops, cellular devices, and the like may all benefit to some extent from wireless sensing techniques made possible through integrated sensing tags 56 and the transmission system 48. For example, FIG. 8 depicts an example of the transmission system 48.

Figure 8:
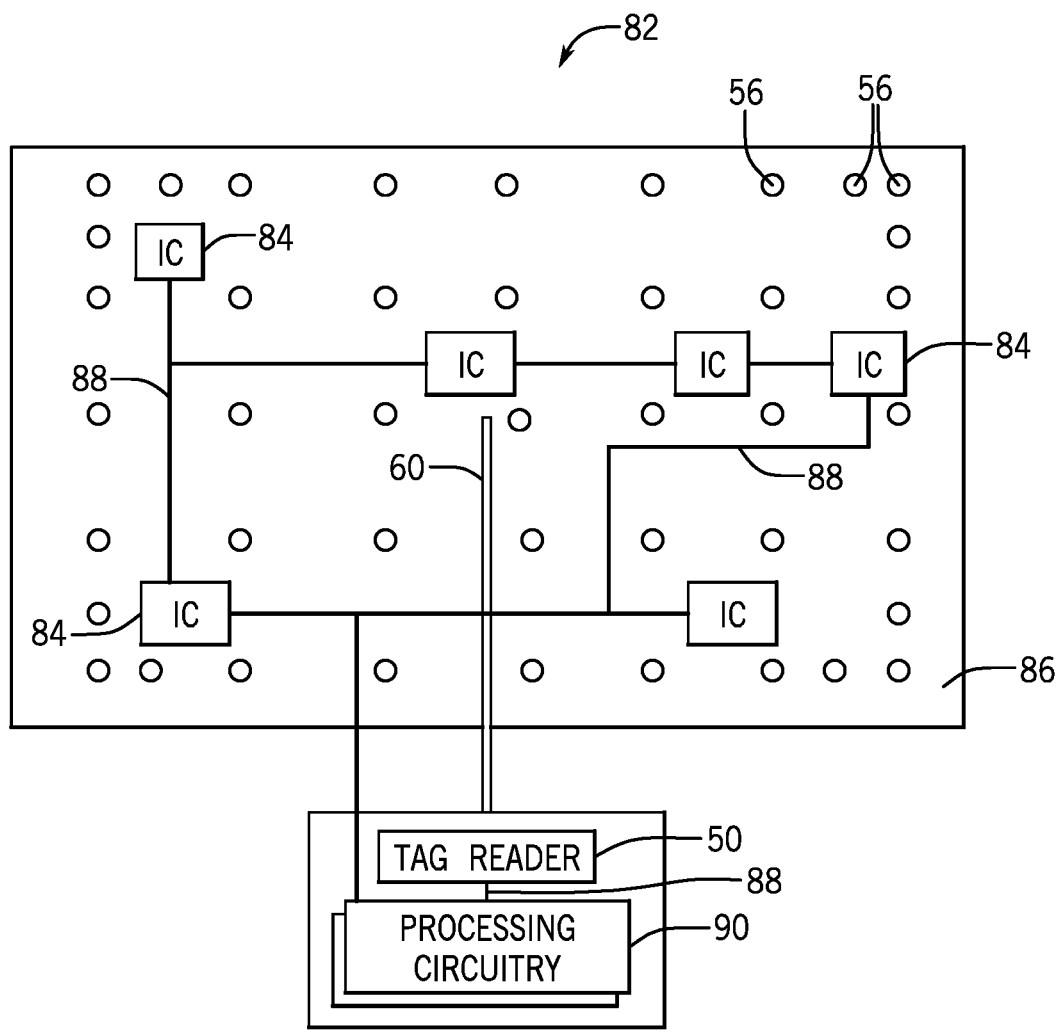
FIG. 8 is a block diagram of the sensing operations of FIG. 7 applied to example circuitry, in accordance with an embodiment.

FIG. 8 is a block diagram of an example of an integrated circuit system 82 that includes components of the transmission system 48 shown in FIG. 7 and integrated circuits 84 on a printed circuit board (PCB) 86. It should be understood that more or less components may be included within the integrated circuit system 82 to provide the above-described benefits associated with the transmission system 48 and integrated sensing tags 56. In addition, it should be noted that a variety of suitable materials and configurations may be used to provide the transmission system 48 and/or the integrated sensing tags 56.

As depicted, the integrated circuits 84 are included on the PCB 86 to perform different operations. The various integrated circuits 84 may communicate with each other (e.g., transmit and/or receive data to perform operations) through couplings 88. Dispersed on the PCB 86 are the integrated sensing tags 56. The integrated sensing tags 56 may receive initiation signals and transmit sensing data signals via the antenna 60. The antenna 60 may be a variety of suitable antennas, including a dipole antenna, a microstrip antenna, a slot antenna, or the like. Indeed, the antenna 60 may be any suitable antenna and may be disposed at any suitable location (e.g., center, bottom) to permit communication with one or more of the integrated sensing tags 56.

For example, integrated sensing tags 56 may include temperature sensing circuitry to perform temperature sensing at different locations of the PCB 86. The integrated circuits 84 may include control circuitry that communicates with the processing circuitry 103, such as through the coupling 88. The processing circuitry 103 may include control circuitry such as a timing controller. In this way, the processing circuitry 103 may receive sensing data one or more of the integrated sensing tags 56 (based on which combination of the integrated sensing tags 56 have been activated by the tag reader 50 for sensing) and may use the sensing data to control an operation of the electronic device 10. For example, the processing circuitry 103 may use the sensing data to control a manner in which an image is displayed on the display 18. Additionally or alternatively, the processing circuitry 103 may transmit some or all of the received sensing data to additional processing circuitry of the processors 12 for further refinement, conclusion gathering, analysis, or the like, to improve or facilitate performing a controlling operation of a portion of the electronic device 10. In some embodiments, the processing circuitry 103 may perform a different operation, or modify an operation is a different way, based on the sensing data received from the integrated sensing tags 56. For example, the processing circuitry 103 may decrease light emitted by the display 18 associated with a certain portion of the PCB 86 when that portion of the PCB 86 is detected as relatively warmer than a second portion of the PCB 86. It should be noted that any suitable control operation may be performed in response to the temperature measurement and/or other parameter measurements.

It may be advantageous to measure temperatures and/or other parameters associated with the integrated circuits 84 and/or the PCB 86 when operating one or more of the integrated circuits 84. Resulting sensing data may be used to adjust or determine a particular operation of one or more of the integrated circuits 84. As described above, to perform the sensing operation, the antenna 60 may transmit an electromagnetic signal (e.g., the initiation signal) to one or more of the integrated sensing tags 56. In response, each of the receiving integrated sensing tags 56 may perform its corresponding sensing operation (e.g., a particular integrated sensing tag 56 may be designed to sense temperature while a different integrated sensing tag may sense temperature and pressure). After sensing, the integrated sensing tags 56 transmit sensing data wirelessly via tag antennas.

The antenna 60 may receive the wirelessly-transmitted sensing data and provide the sensing data to the tag reader 50 for processing by the processing circuitry 90. This data may be communicated between the antenna 60 and the processing circuitry 90 via the couplings 88. The processing circuitry 90 may include any suitable combination of memory 14, storage 16, processors 12, and the like to perform one or more designated processing operations in response to the receiving the sensed data. Although not shown, it should be understood that the processing circuitry 90 may couple to one or more additional circuitry on one or more additional internal and/or external hardware to perform computing and/or processing operations.

During operation, the tag reader 50 may transmit an electromagnetic signal (e.g., the initiation signal) to one or more of the integrated sensing tags 56 via the antenna 60 to initiate sensing operations at particular integrated sensing tags 56 within an at least partial metal enclosure (e.g., a partial metal enclosure, a completely-encompassing metal enclosure, a full metal enclosure). After sensing, the integrated sensing tags 56 may transmit the sensing data back to the timing controller 102 via the antenna 60. The tag reader 50 may receive the sensing data via the antenna 60.

Using the above-described wireless sensing techniques may permit flexible density of integrated sensing tags 56 on the PCB 86. For example, a higher density (e.g., higher concentration) of the integrated sensing tags 56 may be disposed in a portion 104 of the PCB 86 than a density of integrated sensing tags 56 in a portion 106 of the PCB 86. Flexible density of integrated sensing tags 56 may be permitted since the antenna 60 may be operated using beamforming techniques. Forming and shaping the electromagnetic signal transmitted to the selected integrated sensing tags 56 as the initiation signal may enable flexible densities of the integrated sensing tags 56. Specific locations of the integrated sensing tags may be stored in memory or otherwise communicated to the tag reader 50 and/or the timing controller 102 to facilitate in generation of the initiation signal.

The tag reader 50 and/or the timing controller 102 may determine the location of the integrated sensing tags 56 using a variety of techniques including looking up the location of the integrated sensing tag 56 in a memory, such as memory 14, or generally associating the integrated sensing tags 56 with locations of interest for sensing. In this way, the tag reader 50 and/or timing controller 102 performing the beamforming may generally identify which portion of the PCB 86 (or which integrated sensing tag 56) the temperature or sensed parameter is desired to be gathered from. After identifying the portion (or integrated sensing tag 56), the tag reader 50 and/or the timing controller 102 may use the beamforming to target the identified portion (or integrated sensing tag 56) such that the electromagnetic signal is focused toward the identified portion (or integrated sensing tag 56).

Examples of the integrated sensing tags 56 used in a display 18 have been described above. However, these techniques may be versatile. Indeed, wireless and passive sensing techniques, as well as the integrated sensing tags 56, may be used in a variety of applications. For example, a keyboard may include one or more integrated sensing tags 56 with sensors to detect when a key is actuated by a user. The technology described herein may be used to also provide a battery-less pencil that, for example, uses the integrated sensing tags 56 on the pencil tip for contact detection, or authentication uses, where the integrated sensing tags 56 may be used to identify electronic devices even when the electronic device is powered-off. The keyboard, pencil, and authentication examples are merely samples of a variety of use-case examples for the techniques and devices described herein.

Indeed, the above-described techniques improve current sensing technology by decreasing power consumption of electronic devices using sensed data and by increasing flexibility of sensing design (since designs are no longer restricted to a particular distribution or by routing). However, using the above-described techniques in thin metal enclosures may be challenging, thus the following description of designs, techniques, and technology may permit the usage of wireless and passive sensing technology in electronic devices. Additional antenna embodiments are also described herein.

Figure 9:
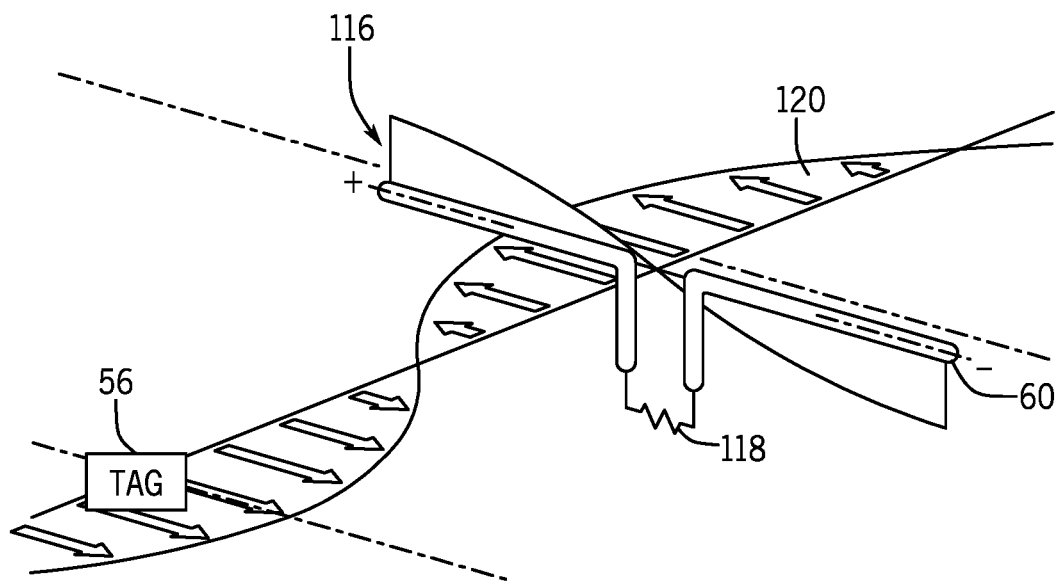
FIG. 9 is an illustration of electromagnetic signals emitted by a dipole antenna in free space, in accordance with an embodiment.

To help illustrate, FIG. 9 is an illustration of electromagnetic signals emitted by a dipole antenna in free space. Wireless and passive tag technology, such as RFID technology, may typically be designed for operation in free-space and line-of-sight free-space transmission paths. Operation in free-space and line-of-sight free-space transmission paths may enable maximum coupling of incident power relative to the sensor tag of the integrated sensing tag 56.

As depicted, the antenna 60 conducts a voltage signal 116. The antenna 60 also has an internal resistance, depicted by resistor 118, that may affect power transfer from the voltage signal 116 to electromagnetic signal 120 generated by the antenna 60. The integrated sensing tag 56 receives the electromagnetic signal 120 and is powered from the incident electromagnetic signal 120. In free-space, the integrated sensing tag 56 may receive maximum coupling of energy from the incident electromagnetic signal 120. However, in a thin meal enclosure, such as a two-layer PCB or a PCB with a metal chassis, the energy of the incident electromagnetic signal 120 is shielded. Thus, less of the energy of the incident electromagnetic signal 120 is transferred to power to the integrated sensing tag 56.

Figure 10:
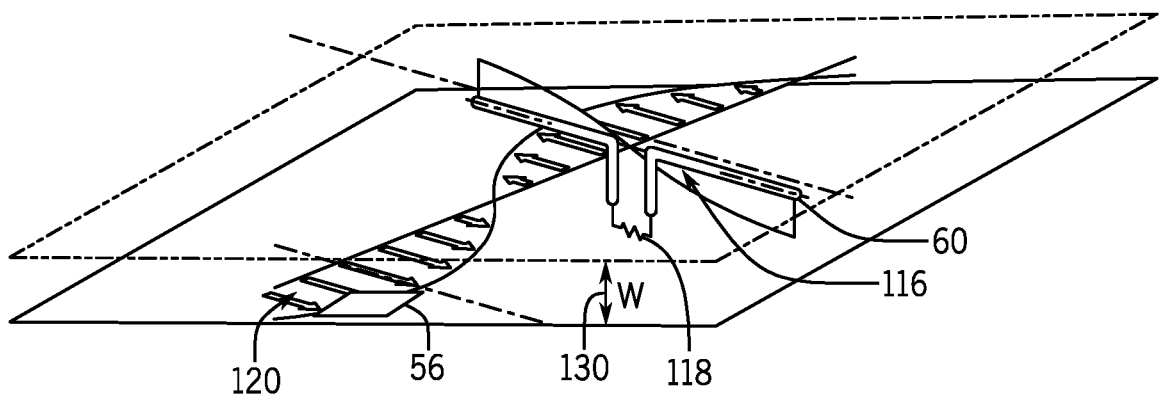
FIG. 10 is an illustration of electromagnetic signals emitted by a dipole antenna in a thin metal enclosure, in accordance with an embodiment.

FIG. 10 is an illustration of electromagnetic signals emitted by a dipole antenna in a thin metal enclosure. Here, the antenna 60 is depicted between a two-layer PCB 86. The antenna 60 receives the voltage signal 116 and emits the electromagnetic signal 120 in response to the voltage signal 116 and based at least in part on the resistor 118.

As the width (e.g., width 130) between the layers of the PCB 86 decreases, the amount of edge-side energy associated with the electromagnetic signal 120 is transmitted to the integrated sensing tag 56. Moreover, in actual use, the integrated sensing tag 56 may be installed parallel and on the bottom layer of the PCB 86. In this way, the integrated sensing tag 56, as depicted, is installed in-plane (as opposed to the perpendicular-to-plane orientation shown in FIG. 9). Having installed the integrated sensing tag 56 in-plane as opposed to perpendicular-to-plane reduced near-field coupling of flux of the electromagnetic signal 120 due to a lack of cross-sectional energy transfer (e.g., oppositely present when the integrated sensing tag 56 is used in free-space and disposed perpendicular to a direction of transmission of the electromagnetic signal 120). In the extreme case, when the width 130 is equal to zero, there is no communication between the antenna 60 and the integrated sensing tag 56.

Thus, special care is to be taken when transmitting electromagnetic signals 120 within thin metal enclosures such as the two-layered PCB 86 and/or a PCB with a metal chassis. For example, different modes of transmission may be used based on the width 130. In cases where the width 130 is less than 0.5 millimeters (mm), waveguide propagation (e.g., transverse magnetic (TM) propagation, like TM110) may be used. However, in cases where the width 130 is greater than or equal to 0.5 mm (including free-space transmission), dipole antenna propagation (e.g., transverse electrical and magnetic (TEM) propagation) may be used. As described herein, the dipole antenna propagation is generally referred to as the first technique for integrated sensing tag sensing operations while the waveguide propagation is generally referred to as a second technique.

Figure 11:
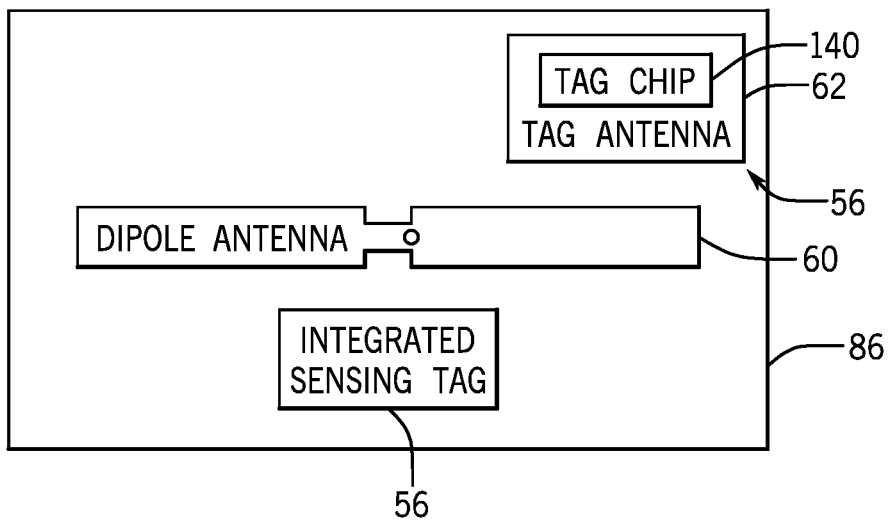
FIG. 11 is an illustration of a first technique for the sensing operation of FIG. 7, in accordance with an embodiment.

FIG. 11 is an illustration of the first technique for the sensing operation described above. The PCB 86 depicted in FIG. 11 is similar to the PCB 86 and devices described earlier in FIG. 8. As illustrated, the PCB 86 includes two integrated sensing tags 56. Each integrated sensing tag 56 includes the tag antenna 62 and a tag chip 140. The tag antenna 62 receives the electromagnetic signal 120 transmitted from the antenna 60 as the initiation signal. The tag antenna 62 may be any suitable antenna, however is depicted as a loop antenna around the tag chip 140. After receiving the electromagnetic signal 120, the tag chip 140 is powered by electrical signals transmitted from the tag antenna 62 and may perform a sensing operation, or any programmed function of the tag chip 140. After sensing, the tag chip 140, still powered by the voltage signals, generates a return voltage signal indicative of the sensing data. The tag antenna 62 transmits the return voltage signal such that an additional electromagnetic signal is generated and is transmitted to the antenna 60. The antenna 60 may be disposed on a grounded plane. It is noted that the PCB 86 may include any suitable number of integrated sensing tags 56 disposed within its layers.

Figure 12:
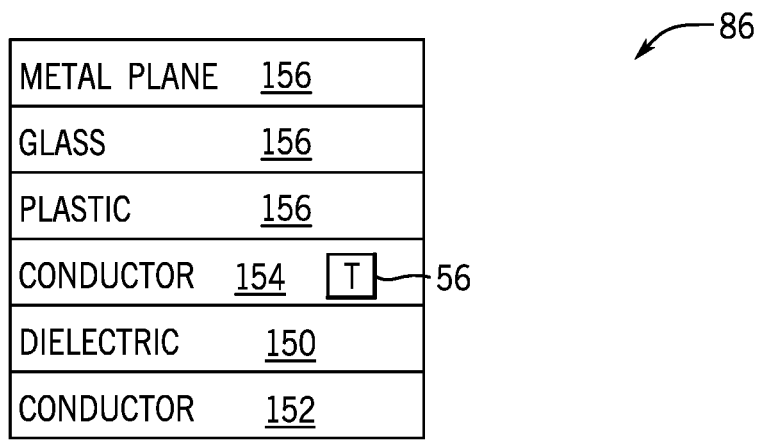
FIG. 12 is a cross-sectional view of circuitry of FIG. 11, in accordance with an embodiment FIG. 13 an illustration of electromagnetic signals emitted by a slot antenna in a thin metal enclosure acting as a wave guide, in accordance with an embodiment.

FIG. 12 is a cross-sectional view of layers of the PCB 86 depicted in FIG. 11. The PCB 86 may include a variety of layers in addition to the layers depicted in FIG. 12, including additional layers between or within the layers. The PCB 86 includes a dielectric layer 150 (e.g., glass-reinforced epoxy laminate (FR4)) disposed on a base conductor layer 152 (e.g., copper). The dielectric layer 150 may be thinner than the base conductor layer 152, however any suitable dimensions may be used. An additional conductor layer 154 may be disposed on the dielectric layer 150. The additional conductor layer 154 may include the integrated sensing tags 56. Additional layers 156 used to form the PCB 86, such as a plastic sheet layer, a glass layer, and/or a metal plane layer may be disposed on the additional conductor layer 154. In manufacturing of the PCB 86, a combination of epitaxial growth, chemical disposition techniques, and/or other circuit board manufacturing techniques may be used to form the layer depicted. The antenna 60 may be disposed in the additional conductor layer 154 or any other suitable layer such that the integrated sensing tags 56 are able to communicate with the tag reader 50 via the antenna 60 and the tag antenna 62.

Figure 13:
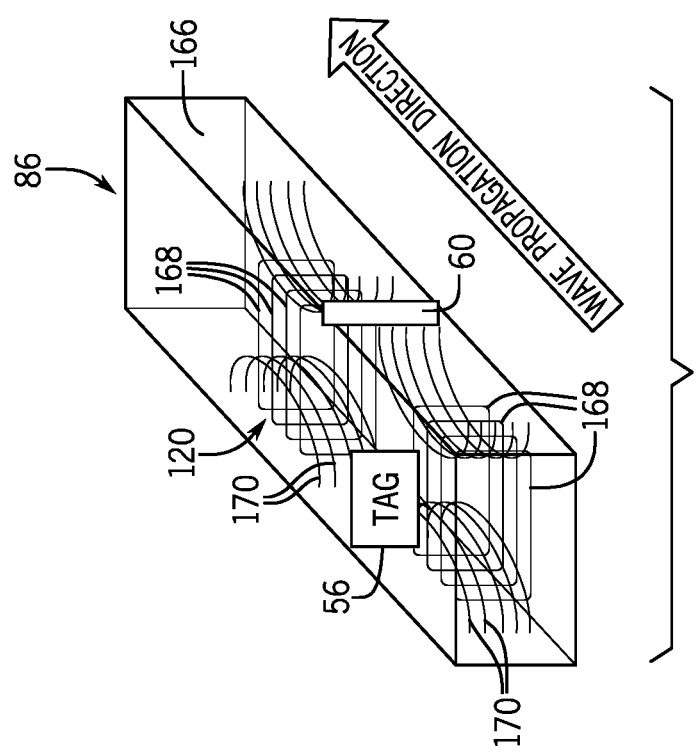

FIG. 13 is an illustration of the above-described second technique as applied to a two-layer PCB 86 enclosure. It should be understood that the illustration represents an example of electromagnetic signal propagation patterns associated with the PCB 86 and that more or less electromagnetic signals may be present during propagation. FIG. 13 depicts propagation within a waveguide 166.

Within the waveguide 166, wave propagation occurs in a direction perpendicular to an orientation of the antenna 60 (e.g., depicted as a slot antenna) that generates the electromagnetic signals 120. As depicted, magnetic flux lines 168 associated with the electromagnetic signals appear as continuous loops while electric flux lines 170 associated with the electromagnetic signals 120 appear with beginning and ending points. Using this depicted orientation, the integrated sensing tag 56 may receive cross-sectional energies from the electromagnetic signals 120, thereby permitting greater power transfer between the electromagnetic signals 120 and the integrated sensing tag 56. The waveguide 166 permits wireless and passive sensing techniques to be used in devices with small clearances between metal planes. For example, the waveguide 166 may permit operation in widths 130 that range from a few centimeters (cm) to 30 micrometers (um). These techniques also permit the integrated sensing tag 56 to be smaller than the integrated sensing tag 56 using for the planar RF techniques described in FIG. 13.

Figure 14:
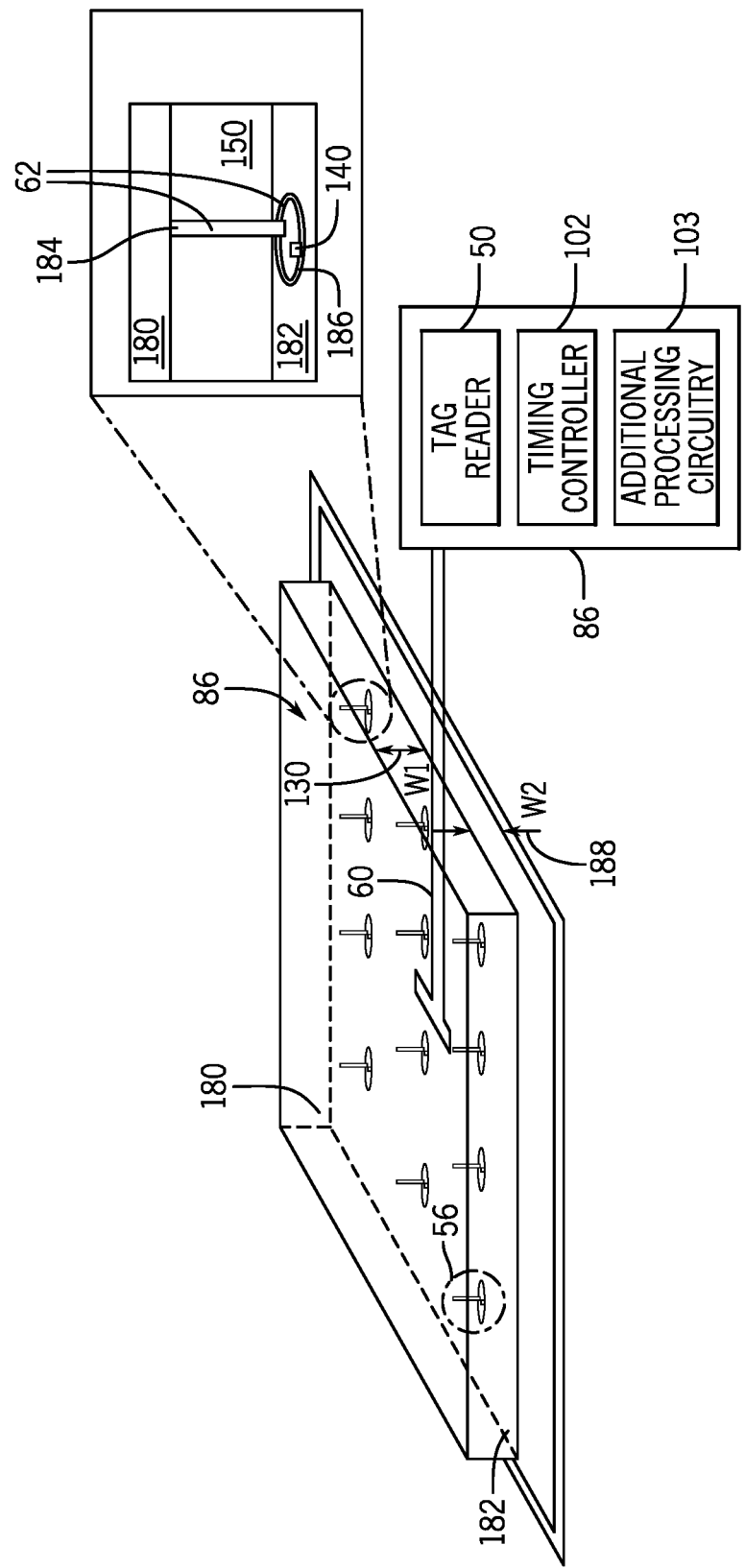
FIG. 14 is an illustration of a second technique for the sensing operation of FIG. 7, in accordance with an embodiment.

FIG. 14 is another illustration of the above-described second technique as applied to a two-layer PCB 86 enclosure. A particular number of integrated sensing tags 56 are depicted in FIG. 14, however it should be understood that any suitable number of integrated sensing tags 56 may be used in the device. In this figure, many similar features are recited as previously described. For example, the antenna 60 is used in the two-layer PCB 86 enclosure to communicate with one or more integrated sensing tags 56 to perform sensing operations.

Featured in FIG. 14 is a first layer 180 disposed on a second layer 182. The second layer 182 may include the tag chip 140 of the integrated sensing tag 56 while the tag antenna 62 may be made from a via 184 (e.g., through silicon via (TSV)) coupling the first layer 180 to the second layer 182. The via 184 may be made from a variety of suitable conductive materials such as copper. The via 184 may couple to a loop 186 formed within the second layer 182. The via 184 and the loop 186 form the tag antenna 62. The first layer 180 and the second layer 182 may have other integrated circuitry and/or routings that are not depicted within FIG. 14. Furthermore, the first layer 180 and the second layer 182 may be separated (e.g., electrically isolated) from each other using a dielectric layer 150, such as FR4.

The first layer 180 may be separated from the second layer 182 such that the PCB 86 has a particular width 130 (e.g., W1). This width 130 may be as thin as tens of micrometers (ums). The enclosure formed from the first layer 180 and the second layer 182 behave like a faraday-cage that shields the wireless signals transmitted between the integrated sensing tags 56 and the antenna 60 from additional and/or external RF radiation, permitting co-existence with other wireless communications within a particular electronic device (e.g., cellular wireless communication). However, performance of the wireless communications may be affected or degraded based at least in part on the width 130 (e.g., such as the width 130 being too large or too small). Furthermore, an additional width 188 (e.g., W2) may additionally or alternatively affect the performance of the wireless communications.

Figure 15A:
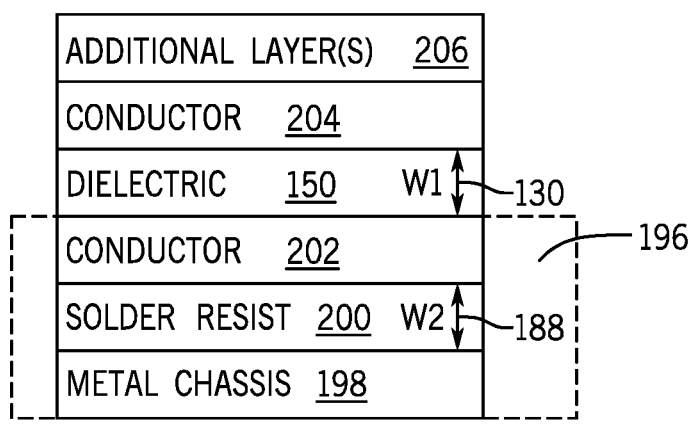
FIG. 15A is a cross-sectional view of the circuitry of FIG. 14, in accordance with an embodiment.

FIG. 15A is a cross-sectional view of layers of the example PCB 86 depicted in FIG. 14. The PCB 86 may include a variety of layers in additional to the layers depicted in FIG. 14, including additional layers between or within the layers. The PCB 86 includes a dielectric layer 150 (e.g., FR4) disposed on a tag layer 196. The tag layer 196 may include a metal chassis layer 198, a solder resist layer 200 disposed on the metal chassis layer 198, and a conductor layer 202 (e.g., copper) disposed on the solder resist layer 200. The conductor layer 202 may be thinner than the solder resist layer 200, however any suitable dimensions may be used.

An additional conductor layer 204 may be disposed on the dielectric layer 150 and the tag layer 196. Additional layer(s) 206 used to form the PCB 86, such as an additional solder resist layer, may be disposed on the additional conductor layer 204. In manufacturing of the PCB 86, a combination of epitaxial growth, chemical disposition techniques, and/or other circuit board manufacturing techniques may be used to form the layer depicted. The antenna 60 may be disposed in the metal chassis layer 198 or any other suitable layer such that the integrated sensing tags 56 are able to communicate with the tag reader 50 via the antenna 60 and the tag antenna 62.

Figure 15B:
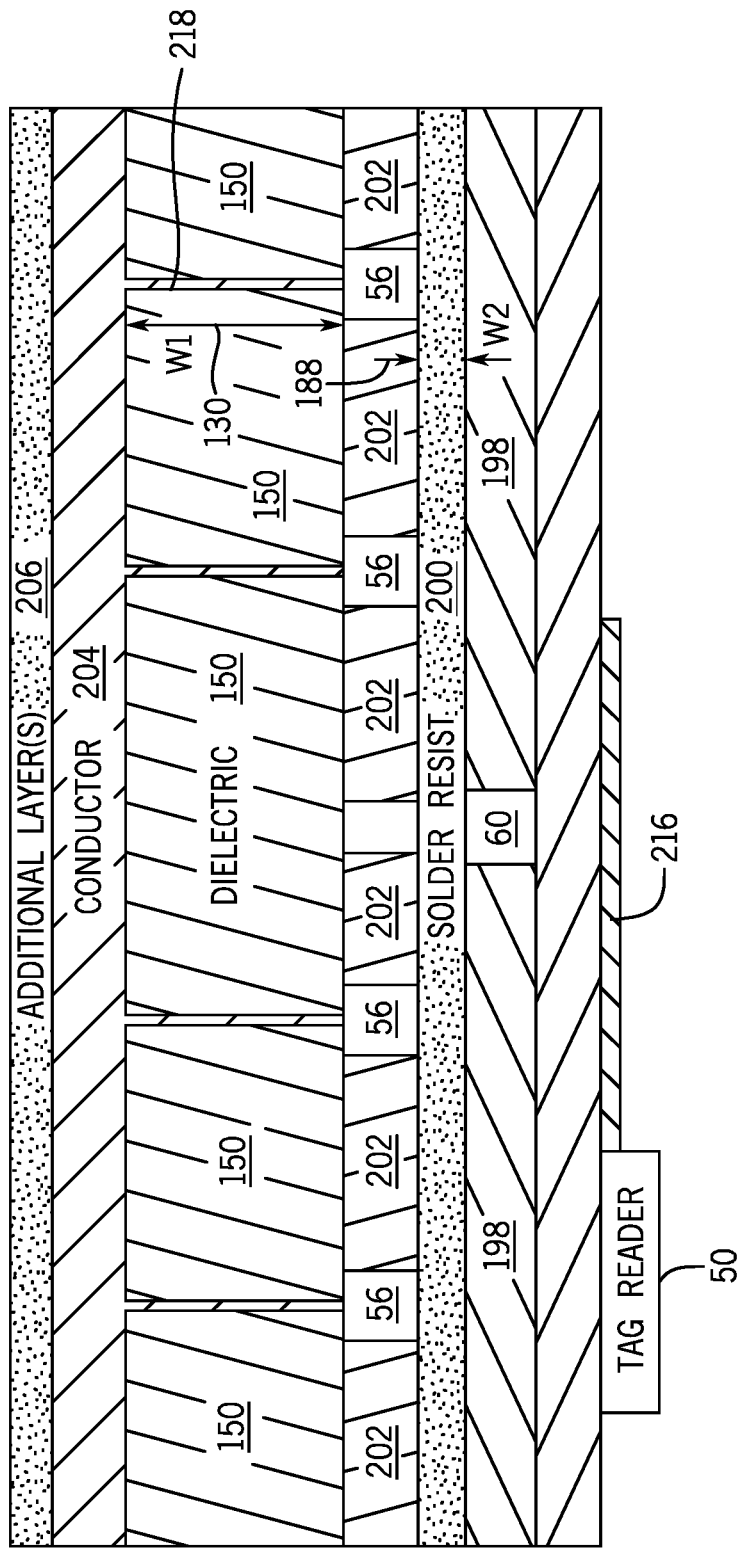
FIG. 15B is another cross-sectional view of the circuitry of FIG. 14, in accordance with an embodiment.

FIG. 15B is an additional cross-sectional view of layers of the example PCB 86 depicted in FIG. 14. The PCB 86 may include a variety of layers in additional to the layers depicted in FIG. 14, including additional layers between or within the layers. This additional cross-sectional view shows the integrated sensing tags 56 formed within the tag layer 196. Layers described above will not be described with reference to FIG. 15B and previously descriptions are relied upon herein.

The additional cross-sectional view depicts the tag reader 50. The tag reader 50 couples to a slot antenna (e.g., antenna 60) via a microstrip feed line 216. The tag reader 50 may transmit a voltage signal via the microstrip feed line 216 to initiate sensing operations of one or more integrated sensing tags 56. The antenna 60 is disposed within the metal chassis layer 198.

During operation, the antenna 60 radiates electromagnetic signals 120 toward the integrated sensing tags 56. Based on the combination of antennas 60 used to emit one or more voltage signals (e.g., a beamforming operation where different antennas 60 may or may not receive voltage signals of varying amounts to intentionally interfere with transmission from the antennas 60 to direct the resulting electromagnetic signal 120 toward one or more selected integrated sensing tags 56). After the tag chip 140 performs the sensing operation, the tag chip 140 returns sensing data via the tag antenna 62 (e.g., formed from via 218) to the tag reader 50 via the antenna 60. In some embodiments, an operation of the display 18 is adjusted in response to the sensing data (e.g., sensed temperatures or other suitable parameter). For example, the timing controller 102 may receive the sensing data from the tag reader 50 and use the sensing data to adjust one or more operations of the electronic device 10.

Comparing the first technique depicted in FIG. 11 to the second technique depicted in FIG. 14, the tag antenna 62 may be a planar device (e.g., occupying one layer of the PCB 86) in the first technique but may occupy multiple layers in the second technique (e.g., occupying at least two layers of the PCB 86). The integrated sensing tag 56 may be larger in the first technique than in the second technique. This larger size of the integrated sensing tag 56 used in the first technique may permit improved RF coupling of the integrated sensing tag 56. The reading-range of the antenna 60 is the range within which the antenna 60 is able to read data from the integrated sensing tag 56. Nulls, or areas of no signal, may not exist inside reading-range of the antenna 60 to the integrated sensing tag 56 when used in the first technique. However, nulls may exist inside the reading-range of the antenna 60 when using the second technique. Furthermore, the electromagnetic signal 120 propagation patterns are different between the techniques, as described with FIG. 9, FIG. 10, and FIG. 13.

Figure 18:
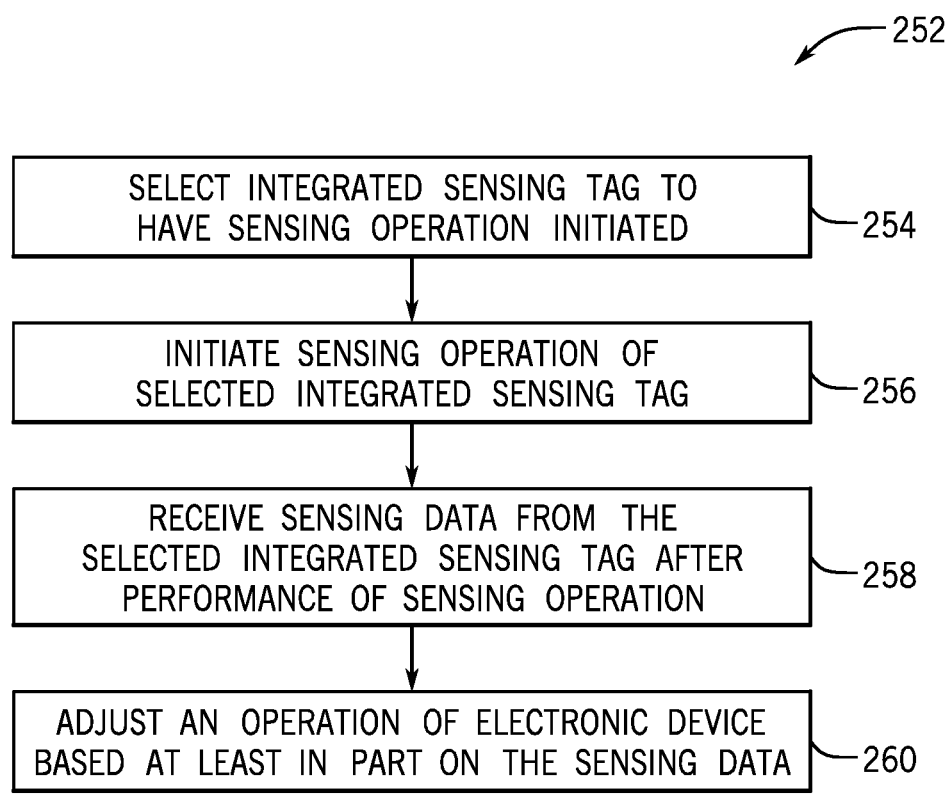
FIG. 18 is a flow chart for a method for operating integrated sensing tags to perform sensing operations, in accordance with an embodiment.

FIG. 18 is an illustration of location-based power scaling that may be used in sensing operations which use integrated sensing tags 56. When using location-based power scaling, average power consumption may be reduced to a fraction of maximum power consumption (e.g., for five linearly increasing ranges, as depicted, 44% of maximum power consumption is estimated to be consumed). In addition, one antenna 60 is depicted and has been described herein. It should be understood that these techniques apply to usage of one or more antennas since an array of antennas may be used to improve beamforming operations when powering one or more of the integrated sensing tags 56. Using more than one antenna and beamforming techniques may also enable multi-dimensional range-stepping, in addition to null-zone and obstacle avoidance.

In location-based power scaling, different ranges are defined within a maximum transmission range 228 of the antenna 60. For each range 230 (e.g., range 230A ($R_1$), range 230B ($R_2$), range 230C ($R_3$), range 230D ($R_4$), range 230E ($R_5$)), a particular amount of power (e.g., $P_1$, $P_2$, $P_3$, $P_4$, $P_5$) is to be used for a period of time (e.g., $T_1$, $T_2$, $T_3$, $T_4$, $T_5$) such that each integrated sensing tag 56 is read within that range. The power used to reach the maximum transmission range 228 (e.g., Pmax) may be equal to the power for the last transmission range 230 (e.g., Pmax=$P_5$). It is noted that sometimes the periods of time generally increases between the ranges (e.g., $T_1<T_2<T_3<T_4<T_5$) since the number of integrated sensing tags 56 and/or other interferences generally increases that affect the back-scatter path of the electromagnetic signal 120 from the antenna 60.

In addition, based on particular use-case, certain integrated sensing tags 56 within each of the ranges 230 may be polled by the tag reader 50 more frequently than other integrated sensing tags 56 in the same range 230. Equation 1 may define a normalized average polling activity-factor, $a_i$, for each range 230.

$$0 \leq a_i \leq 1, \Sigma a_i = 1 \quad [1]$$

Using Equation 1, the average power consumption of the tag reader 50 may be reduced and given by Equation 2. Provided below, Equation 2 is a function of normalized average polling activity-factor, $a_i$, transmission powers (e.g., $P_i$), and transmission times (e.g., $T_i$), and may be less than or equal to the maximum power used to read each integrated sensing tag 56 (e.g., $P_{max}$).

$$P_{avg} = \sum_{i=1}^{N} a_i T_i P_i \div \sum_{i=1}^{N} a_i T_i \leq P_{max} \quad [2]$$

Take for example the use-case where for each range 230 (e.g., each of the five ranges depicted), each integrated sensing tag 56 is read. In this case, the normalized average polling activity factor for the first four ranges 230A, 230B, 230C, 230D equals zero (e.g., $a_1=a_2=a_3=a_4=0$) and for the fifth and last range 230E equals one (e.g., $P_5=1$). In this example, the average power consumption corresponds wholly (e.g., 1, 100%) to the amount of power used by the tag reader 50 to transmit to the fifth range 230E (e.g., $P_5=P_{avg}=P_{max}$).

Figure 16:
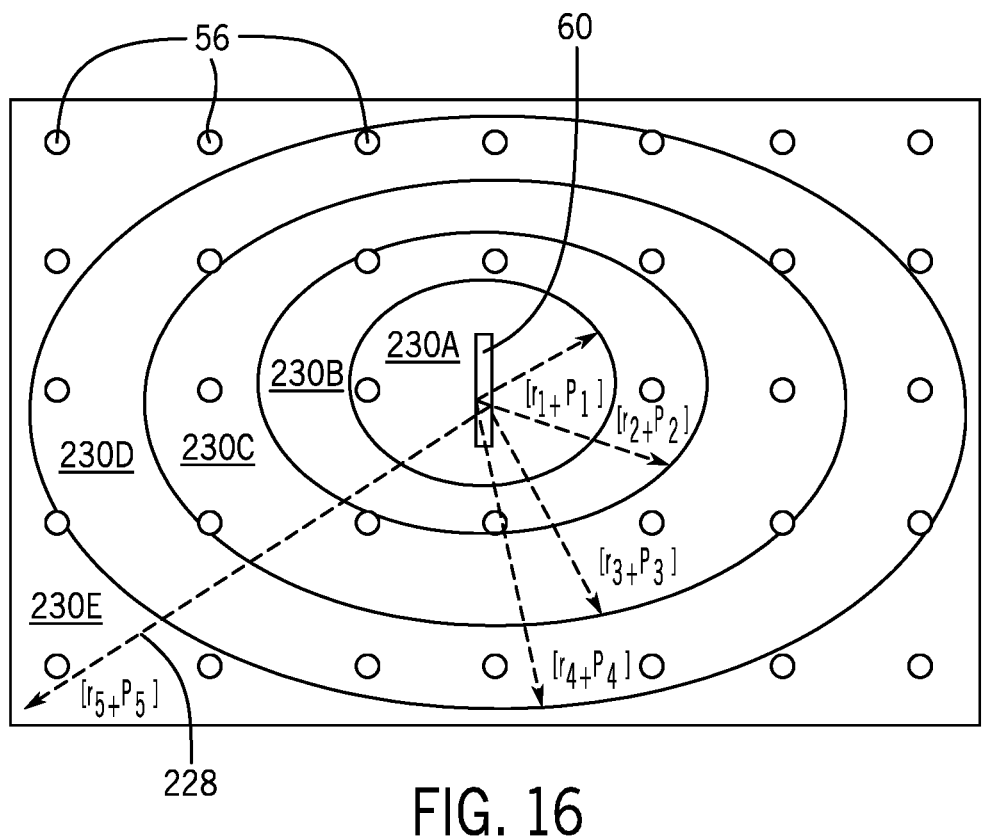
FIG. 16 is an illustration of location based power scaling that may be used in sensing operations which use integrated sensing tags, in accordance with an embodiment.

However, for the average case where each of the integrated sensing tags 56 are read using range-stepping techniques (e.g., assuming the same five linearly increasing range 230 segments depicted in FIG. 16), each of the normalized average polling activity factor for the fives ranges 230 equals one-fifth (e.g., $a_1=a_2=a_3=a_4=a_5=\frac{1}{5}$). When the period of time to reach each of the sensors (e.g., $T_i$ is equal for each range (e.g., $T_1=T_2=T_3=T_4=T_5$) and when each of the ranges 230 are equal segments (e.g., $R_1=R_2=R_3=R_4=R_5$), Equation 3 applies. Furthermore, applying this example into the above-described equations yields the relationship shown with Equation 4 and highlights the power consumption savings that may be achieved using the exemplary five ranges, where K is a constant and $P_5$ considered equal to $P_{max}$ (e.g., $P_5=KR_5^2=P_{max}$).

$$P_{avg} = \sum_{i=1}^{N} P_i/5 \leq P_5 = P_{max} \quad [3]$$

if $P_i = KR_i^2$;

$$P_{avg} = K/5 \sum_{i=1}^{N} R_i^2 = KR_5^2/5 \sum_{i=1}^{5} i^2/25 = 0.44 KR_5^2 = 0.44 P_{max} \quad [4]$$

Thus, as described above, the tag reader 50 may operate to adjust the voltage signal transmitted to the antenna 60 based on the actual location of the integrated sensing tag on the PCB 86. In doing so, the tag reader 50 may facilitate power consumption savings associated with sensing operations of the electronic device. Furthermore, selectively changing power used to generate the electromagnetic signal based on a range 230 associated with the selected (e.g., targeted) integrated sensing tag 56 may be used in combination with multiple antennas used for beamforming operations. In this way, different antennas may be supplied different voltages by the tag reader 50 based at least in part on an overall transmission pattern desired to be used to activate the integrated sensing tags 56.

Figure 17:
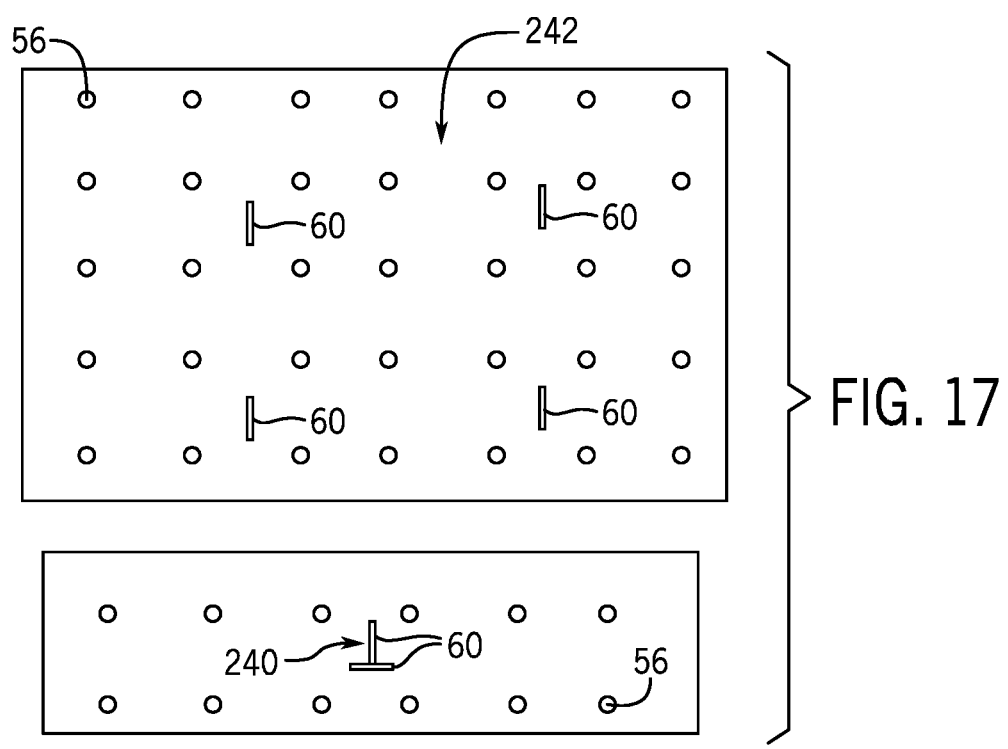
FIG. 17 is an illustration of field shaping and null mitigation that may be used in sensing operations which use integrated sensing tags, in accordance with an embodiment.

Additionally or alternatively, multiple antennas 60 may be used to perform field shaping and null mitigation operations. FIG. 17 is an illustration of field shaping and null mitigation that may be used in sensing operations which use integrated sensing tags 56. Due to standing wave patterns of electric and magnetic fields present during electromagnetic signal 120 propagation in the above-described wireless and passive sensing operations, some nulls may be present. In wave propagation, a null is a point where the waveform is low or zero (e.g., a signal trough, wave trough). In the second technique (e.g., waveguide RF example), most of the nulls form along the direction of the slot antenna 60.

Several techniques may be used to reduce a formation of nulls. One technique may be to include multi-axis antennas 60. Inclusion of multi-axis antennas 60 may reduce most nulls based at least in part on more antennas 60 being available for signal receipt and/or transmission. An example of a multi-axis antenna 240 is two slot antennas 60 formed in the PCB 86 perpendicular to each other and sharing a common axis (e.g., two slot antennas 60 at 90 degrees).

Another example may be to include multiple slot antennas 60, as is shown with PCB 86B. Multiple slot antennas 60 (e.g., a multi-slot antenna 242) may be used to shape electric and magnetic fields associated with the electromagnetic signal 120. Each of the electric and magnetic fields may be shaped to trade-off range with power consumption and to target specific integrated sensing tags (e.g., as part of a beamforming operation). Each of the slot antennas 60 of the multi-slot antenna 242 may be driven by the same tag reader 50. Any suitable driving technique may be used to drive the antennas 60, for example, the tag reader 50 may use a time-interleaved technique to drive the individual antennas 60 sequentially. These described techniques may be customized to particular physical attributes of the electronic device 10.

In addition, in some examples, the tag reader 50 may include power tracking circuitry to perform on-chip maximal power tracking. The power tracking circuitry may adaptively change tuning associated with communicating with the integrated sensing tags 56 in response to determinations of power transfers between the antenna 60 and the tag antenna 62. Thus, the tag reader 50 via the power tracking circuitry may generate electrical signals to tune the resulting electromagnetic signals sent via the antenna 60 based on the determinations of the power transfers. In some embodiments, the tag reader 50 may also tune the resulting electromagnetic waves signals based at least in part on a location of the integrated sensing tag 56 and determinations of the power transfers. The determinations of power transfers may be performed in real-time by the tag reader 50 and/or have some delay between a time of measurement and a time of determination.

The systems and methods described above may be generalized into a cohesive method. FIG. 18 is a flow chart for a method 252 for operating integrated sensing tags to perform sensing operations. Although the following description of the method 252 is described as being performed by the tag reader 50, it should be understood that any suitable processing-type device may perform the method 252. Also, it should be understood that the method 252 may be performed in any suitable order and is not limited to being performed in the order depicted in FIG. 18.

At block 254, the tag reader 50 may select an integrated sensing tag 56 that is to initiate its sensing operation. The tag reader 50 may select the integrated sensing tag 56 based on a variety of selection parameters. Selection parameters may include the operation to be adjusted based on the sensing data, previous sensing data (e.g., if the tag reader 50 is monitoring abnormally received data), a sensing pattern defined and stored in memory 14 defining which integrated sensing tag 56 to be activated (e.g., have sensing operations initiated) next, an instruction from the timing controller 102 indicating which integrated sensing tag 56 is to be activated next, or the like. After selection of the integrated sensing tag 56 to be activated, tag reader 50 may generate one or more voltage signals based at least in part on the physical location of the selected integrated sensing tag 56 on the PCB 86. In this way, the tag reader 50 (e.g., transmitter 52 of the tag reader 50) may perform a beamforming operation to determine which voltage signals to generate such that resulting electromagnetic signals 120 (e.g., generated by one or more antennas 60) are tuned and/or directed toward the selected integrated sensing tag 56.

At block 256, the tag reader 50 may initiate the sensing operation of the selected integrated sensing tag 56. This may happen through the tag reader 50 transmitting the generated voltage signal to the antenna 60 (or in the cases of beamforming, the one or more generated voltage signals based on a number of antennas 60 in an array used for beamforming). As described earlier, the antenna 60 may generate electromagnetic signals 120 based on the generated voltage signal for propagation to the selected integrated sensing tag 56. Thus, by changing one or more generated voltage signals, the tag reader 50 may shape the electromagnetic signals 120 to be transmitted to the integrated sensing tags 56 (e.g., beamforming operations). This series of operations may initiate the sensing operation of the integrated sensing tag 56 because the integrated sensing tag 56 may be powered from the electromagnetic signal generated by the antenna 60.

After the selected integrated sensing tag 56 performs its sensing operation, at block 258, the tag reader 50 may receive sensing data from the selected integrated sensing tag 56. The selected integrated sensing tag 56 using its associated tag antenna 62 to transmit any sensed data from the sensing operation. The selected integrated sensing tag 56 may transmit an electrical signal that is modulated, adjusted, or varied based on the results from the sensing operation. This electrical signal may be used to generate the electromagnetic signal transmitted to the antenna 60.

At block 260, the tag reader 50 transmits data to the timing controller 102, which adjusts one or more operations of the electronic device 10 based at least in part on the sensing data received. In some embodiments, the timing controller 102 performs one or more processing operations on the sensing data before using the sensing data in its adjustment operation and/or the tag reader 50 performs one or more processing operations on the sensing data before transmitting it to the timing controller 102. The timing controller 102 and/or the tag reader 50 may interpret the sensing data and derive an amount from the sensing data. The timing controller 102 and/or the tag reader 50 may save the sensing data directly, or a value or amount derived from the sensing data, in memory 14 for future reference.

In some embodiments, the sensing data is used to modify (e.g., adjust, start, end) an operation of the display 18. The manner in which control operations changes the operation of the display 18, such as changing light emission from one or more light-emitting diodes (LEDs) or other suitable light-emitting components of the display 18, is based on the particular display technology used in the display 18. For example, in a pulse-width modulation emission scheme, a supplied current signal may be used to modulate light emission from the LED. Modulating the light emitted from the LED may control brightness of the LED and the modulation pattern may be adjusted in response to sensing data from the integrated sensing tags 56. Any suitable light emission control scheme may be used to control light emission from the LED or any suitable light-emitting component. As another example, a particular sensing data result may cause the display 18 to be operated off (e.g., a sensed temperature exceeds a threshold so display 18 is turned off). Furthermore, any suitable modification to the operation of the display 18 may be performed as a result of the techniques described herein.

Thus, keeping the forgoing in mind, the technical effects of the present disclosure include techniques for wirelessly transmitting and/or receiving electromagnetic signals between processing components and sensing components, for example, by improving sensing device design and thus forming an integrated sensing tag that leverages passive tag technology, such as RFID tags. The techniques include considerations for integrated sensing tag design, variations of the integrated sensing tag design, and techniques for improving power consumption and directivity of the transmitted electromagnetic signal to the integrated sensing tag to initiate sensing. As described herein, this disclosure provides systems and methods for performing wireless sensing operations within partial or full metal enclosures in a way that maintains characteristics of wireless signals associated with the wireless sensing operations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
a physical layer configured to form a portion of a circuit to be sensed;
an antenna configured to generate an electromagnetic signal in response to receiving a voltage or current signal;
processing circuitry configured to generate the voltage or current signal, wherein the processing circuitry is configured to couple to the antenna; and
an integrated sensing tag at least partially embedded within the physical layer that comprises:
a tag antenna configured to receive the electromagnetic signal from the antenna as part of a wireless transmission; and
a tag chip coupled to the tag antenna and configured to:
perform a sensing operation in response to the tag antenna receiving the electromagnetic signal, the sensing operation configured to sense a property of associated with the circuit;
generate sensing data as part of the sensing operation; and
transmit the sensing data to the antenna via the tag antenna.

2. The electronic device of claim 1, comprising an antenna array that comprises the antenna and additional antennas, wherein the processing circuitry adjusts the voltage or current signal based at least in part on a beamforming operation configured to generate an electromagnetic signal to power-on the integrated sensing tag without powering-on an additional integrated sensing tag.

3. The electronic device of claim 2, wherein the processing circuitry adjusts the voltage or current signal based at least in part on a beamforming operation configured to cause the antenna array to generate an electromagnetic signal to power-on the integrated sensing tag without powering-on an additional integrated sensing tag.

4. The electronic device of claim 1, wherein the antenna is configured as a slot antenna.

5. The electronic device of claim 1, wherein the antenna is configured as a dipole antenna.

6. The electronic device of claim 1, wherein the processing circuitry is configured to change an operation of the electronic device based at least in part on the sensing data.

7. The electronic device of claim 1, wherein the processing circuitry is configured to adjust the voltage or current signal based on a distance from the antenna that the integrated sensing tag is disposed.

8. The electronic device of claim 1, wherein the tag antenna is disposed perpendicular to the antenna.

9. The electronic device of claim 1, wherein the antenna and the integrated sensing tag are configured in an asymmetric configuration, a symmetric configuration, or any combination thereof, wherein the antenna is configured as a dipole antenna, a microstrip antenna, a slot antenna, an antenna designed to permit suitable communication with the integrated sensing tag via transmission of the electromagnetic signal to the tag antenna, or any combination thereof, and wherein a geometric design of the antenna and orientation of the antenna relative to the tag antenna is selected based at least in part on a determination of an effect of the geometric design and orientation to improve communication reliability and efficiency between the antenna and the tag antenna.

10. A tangible, non-transitory, machine-readable medium, comprising machine-readable instructions that, when executed by one or more processors, cause the machine to:

determine, via processing circuitry, an integrated sensing tag as a target integrated sensing tag from a plurality of integrated sensing tags;

initiate, via the processing circuitry, sensing operations within an at least partial metal enclosure by generating a voltage or current signal configured to create an electromagnetic signal used to power the integrated sensing tag disposed separate from the processing circuitry;

receive, via the processing circuitry, sensing data from the integrated sensing tag via a wireless signal transmission;

identify, via the processing circuitry, a sensor-based action based upon the sensing data; and implement, via the processing circuitry, the sensor-based action via circuitry electrically coupled to the processing circuitry.

11. The tangible, non-transitory, machine-readable medium of claim 10, comprising instructions that cause the machine to determine, via the processing circuitry, the voltage or current signal and one or more additional voltage or current signals, wherein each voltage or current signal is configured to be transmitted to a respective antenna of a plurality of antennas, and wherein the plurality of antennas are configured to create the electromagnetic signal based at least in part on the voltage or current signal and the one or more additional voltage or current signals.

12. The tangible, non-transitory, machine-readable medium of claim 10, comprising instructions that cause the machine to:

perform, via the processing circuitry, a beamforming operation to generate one or more additional voltage or current signals based upon a location of the target integrated sensing tag; and selectively transmit, via the processing circuitry, the one or more additional voltage or current signals to one or more antennas such that the target integrated sensing tag is powered-on in lieu of powering-on one or more non-targeted an additional integrated sensing tags.

13. The tangible, non-transitory, machine-readable medium of claim 10, wherein determining the target integrated sensing tag comprises referencing a look-up table, memory, or any combination thereof to determine in which direction the beamforming operation is to be focused.

14. An integrated sensing tag, comprising:

a tag antenna configured to receive a wireless initiation signal from processing circuitry configured to initiate sensing operations within an at least partial metal enclosure, wherein the tag antenna is embedded between at least two layers of a printed circuit board; and a tag chip coupled to the tag antenna, wherein the tag chip is configured to:

power-on in response to the tag antenna receiving the wireless initiation signal;

perform a sensing operation in response to powering-on; and generate sensing data to be transmitted to the processing circuitry via the tag antenna.

15. The integrated sensing tag of claim 14, comprising a printed circuit board, and wherein the tag antenna is formed from a via that extends through at least two layers of the printed circuit board.

16. The integrated sensing tag of claim 14, wherein the tag antenna is disposed around the tag chip, such that the tag antenna is configured as a loop antenna.

17. The integrated sensing tag of claim 14, comprising a printed circuit board, wherein the integrated sensing tag is disposed at least in part on the printed circuit board.

18. The integrated sensing tag of claim 14, wherein the sensing operations comprise sensing a temperature, a pressure, a voltage signal, a current signal, or any combination thereof.

19. The tangible, non-transitory, machine-readable medium of claim 10, wherein determining the target integrated sensing tag comprises determining a region to activate, and wherein the region comprises the target integrated sensing tag and one or more additional target integrated sensing tags of the plurality of integrated sensing tags.

20. The integrated sensing tag of claim 14, wherein the integrated sensing tag is disposed within a keyboard or pencil, and wherein the sensing operations are configured to sense pressures as part of a contact detection operation that detects when a key of the keyboard has been activated or to detect when a portion of the pencil has made contact with a surface based at least in part on the sensed pressures.

* * * * *

UNITED STATES PATENT AND TRADEMARK OFFICE
CERTIFICATE OF CORRECTION

PATENT NO. : 10,839,171 B2
APPLICATION NO. : 16/391011
DATED : November 17, 2020
INVENTOR(S) : Daibashish Gangopadhyay et al.

Page 1 of 1

It is certified that error appears in the above-identified patent and that said Letters Patent is hereby corrected as shown below:

In the Claims

Column 20, Claim 1, Line 20, delete the word "of".

Column 20, Claim 3, Line 34, replace the word "a" with --the--.

Column 20, Claim 3, Line 35, replace the word "an" with --the--.

Column 20, Claim 3, Line 36, replace the word "an" with --the--.

Column 20, Claim 9, Line 60, replace the word "is" with --are--.

Column 21, Claim 12, Line 39, delete the word "an".

Column 21, Claim 13, Line 44, replace the word "the" with --a--.

Column 22, Claim 15, Line 16, replace the word "a" with --the--.

Column 22, Claim 15, Line 18, insert the word --the-- between "through" and "at".

Column 22, Claim 17, Line 23, replace the word "a" with --the--.

Signed and Sealed this
Twenty-second Day of December, 2020

Andrei Iancu
*Director of the United States Patent and Trademark Office*